(12) United States Patent
Chan et al.

(10) Patent No.: US 11,353,196 B2
(45) Date of Patent: Jun. 7, 2022

(54) LAMP, LAMP DRIVER AND LAMP LIGHTING SYSTEM

(71) Applicant: TROLMASTER ARGO INSTRUMENTS CO., LIMITED, Kowloon (HK)

(72) Inventors: Ka Suen Chan, Hong Kong (HK); Yao Liang Lin, Fujian (CN)

(73) Assignee: TROLMASTER ARGO INSTRUMENTS CO., LIMITED, Kowloon (HK)

( * ) Notice: Subject to any disclaimer, the term of this patent is extended or adjusted under 35 U.S.C. 154(b) by 122 days.

(21) Appl. No.: 16/888,705

(22) Filed: May 30, 2020

(65) Prior Publication Data
US 2021/0372599 A1  Dec. 2, 2021

(51) Int. Cl.
| | | |
|---|---|---|
| H01R 33/00 | (2006.01) |
| F21V 21/002 | (2006.01) |
| A01G 7/04 | (2006.01) |
| F21S 2/00 | (2016.01) |
| F21V 17/16 | (2006.01) |
| F21K 9/235 | (2016.01) |
| H01R 13/627 | (2006.01) |
| F21Y 115/10 | (2016.01) |

(52) U.S. Cl.
CPC ............ *F21V 21/002* (2013.01); *A01G 7/045* (2013.01); *F21K 9/235* (2016.08); *F21S 2/00* (2013.01); *F21V 17/16* (2013.01); *H01R 13/6272* (2013.01); *F21Y 2115/10* (2016.08)

(58) Field of Classification Search
CPC ....... F21V 21/002; F21V 17/16; A01G 7/045; F21K 9/235; F21S 2/00; H01R 13/6272; H01R 24/00; H01R 33/00; H01R 13/627; F21Y 2115/10
See application file for complete search history.

(56) References Cited

U.S. PATENT DOCUMENTS

| | | | | |
|---|---|---|---|---|
| 9,171,436 B1* | 10/2015 | Covelli | ................. | G08B 5/36 |
| 9,644,828 B1* | 5/2017 | May | ................. | F21K 9/275 |
| 9,826,602 B1* | 11/2017 | Tsai | ................. | G09B 23/183 |
| 10,180,241 B1* | 1/2019 | Van Winkle | ........... | F21V 23/04 |
| 10,378,746 B2* | 8/2019 | Skergeth | .............. | F21V 19/003 |
| 10,865,954 B2* | 12/2020 | Lu | ................. | F21S 8/061 |
| 11,060,710 B2* | 7/2021 | Ko | ................. | F21S 41/148 |
| 11,118,748 B1* | 9/2021 | McCain | ................. | F21S 45/50 |
| 11,162,664 B1* | 11/2021 | Lu | ................. | F21V 15/015 |
| 11,175,028 B1* | 11/2021 | Chen | ................. | F21V 23/06 |

(Continued)

*Primary Examiner* — Abdullah A Riyami
*Assistant Examiner* — Nelson R. Burgos-Guntin

(57) ABSTRACT

A lamp, a lamp driver and a lamp lighting system are provided. The lamp includes a lamp housing and a plug connector fixed on the lamp housing, wherein the plug connector includes a plug insulator, a plug terminal group and at least one buckle, the plug insulator includes multiple plug side walls and a plug bottom wall, the multiple plug side walls enclose to form a docking chamber for docking with a socket connector of a lamp driver, the plug terminal group is mounted on the plug bottom wall and is exposed in the docking chamber; the buckle is connected with one plug side wall and forms a V-shaped structure with an outer surface of the plug side wall, and the buckle is configured to fix the plug connector in the socket connector.

17 Claims, 12 Drawing Sheets

(56) References Cited

U.S. PATENT DOCUMENTS

| | | | |
|---|---|---|---|
| 2003/0137835 A1* | 7/2003 | Mier-Langner | F21V 21/34 |
| | | | 362/220 |
| 2011/0242814 A1* | 10/2011 | Markle | F21V 3/00 |
| | | | 362/294 |
| 2012/0099317 A1* | 4/2012 | Liu | F21V 23/026 |
| | | | 362/249.02 |
| 2012/0300437 A1* | 11/2012 | Lu | F21S 2/00 |
| | | | 362/147 |
| 2013/0141904 A1* | 6/2013 | Verfuerth | F21V 23/023 |
| | | | 362/221 |
| 2013/0229802 A1* | 9/2013 | Fukushima | F21V 23/06 |
| | | | 362/235 |
| 2014/0362574 A1* | 12/2014 | Barrett | F21S 4/28 |
| | | | 362/249.03 |
| 2015/0198324 A1* | 7/2015 | O'Brien | F21V 23/009 |
| | | | 362/294 |
| 2016/0159446 A1* | 6/2016 | Covelli | G08B 5/36 |
| | | | 340/984 |
| 2017/0089525 A1* | 3/2017 | Xiong | H05B 45/20 |
| 2017/0089557 A1* | 3/2017 | Ericson | F21S 8/04 |
| 2019/0346091 A1* | 11/2019 | Zhang | F21V 23/002 |
| 2020/0400280 A1* | 12/2020 | Barak | H01R 33/00 |
| 2021/0140617 A1* | 5/2021 | Tang | H01R 13/6205 |
| 2021/0143590 A1* | 5/2021 | Rafferty | H01R 25/145 |
| 2021/0341134 A1* | 11/2021 | May | F21V 23/02 |

* cited by examiner

LAMP, LAMP DRIVER AND LAMP LIGHTING SYSTEM

TECHNICAL FIELD

The present application relates to the technical field of lighting technology, and more particularly to a lamp, a lamp driver and a lamp lighting system.

BACKGROUND

With the aggravation of environmental pollution, greenhouse and indoor planting which is completely isolated from the outside world has been widely popularized. Light is one of the most important physical environmental factors for plant growth and development, thus plant growth lamps are usually used for photosynthesis in plants.

Under the condition of a large-scale greenhouse and indoor planting, the number of plant growth lamps is large, and many plant growth lamps are electrically connected to a same lamp driver through multiple external cable lines so that they can be powered by the lamp driver.

SUMMARY

One embodiment of the present application provides a lamp, including a lamp housing and a plug connector fixed on the lamp housing;

wherein the plug connector includes a plug insulator, a plug terminal group and at least one buckle, the plug insulator includes a plurality of plug side walls and a plug bottom wall, the plurality of plug side walls enclose to form a docking chamber for docking with a socket connector of a lamp driver, the plug terminal group is mounted on the plug bottom wall and is exposed in the docking chamber:

the buckle is connected with one plug side wall and forms a V-shaped structure with an outer surface of the plug side wall, and the buckle is configured to fix the plug connector in the socket connector.

Another embodiment of the present application provides a lamp driver, including a housing and at least one socket connector fixed on the housing;

wherein the socket connector includes a socket insulator and a socket terminal group, the socket insulator includes a plurality of socket side walls and a socket bottom wall, the plurality of socket side walls enclose to form a receiving chamber for receiving a plug connector of a lamp, part of the socket bottom wall protrudes into the receiving chamber to form a docking part, and the socket terminal group is mounted on the docking part;

the receiving chamber includes at least one clamping slot formed by one side of the docking part and one socket side wall, and the clamping slot is configured to prevent the plug connector from detaching from the socket connector.

Another embodiment of the present application provides a lamp lighting system, including a lamp driver and at least one lamp:

wherein the lamp v a lamp housing and a plug connector fixed on the lamp housing, the lamp driver includes a housing and at least one socket connector:

the plug connector includes a plug insulator, a plug terminal group and at least one buckle, the plug insulator includes a plurality of plug side walls and a plug bottom wall, the plurality of plug side walls enclose to form a docking chamber for docking with the socket connector, the plug terminal group is mounted on the plug bottom wall and is exposed in the docking chamber;

the buckle is connected with one plug side wall and forms a V-shaped structure with an outer surface of the plug side wall;

the socket connector includes a socket insulator and a socket terminal group, the socket insulator includes a plurality of socket side walls and a socket bottom wall, the plurality of socket side walls enclose to form a receiving chamber, part of the socket bottom wall protrudes into the receiving chamber to form a docking part, shape of the docking part matches shape of the docking chamber, and the socket terminal group is mounted on the docking part;

the receiving chamber includes at least one clamping slot formed by one side of the docking part and one socket side wall;

the plug connector is connected with the socket connector, and the buckle of the plug connector is stuck into the clamping slot of the socket connector.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

For clearer descriptions of the objectives, technical solutions, and advantages of the present application, the present application is further described with reference to specific embodiments and attached drawings. It should be understood that the specific embodiments described herein are only intended to explain the present application instead of limiting the present application.

It should be noted that when an element is "secured to/fixedly connected with" another element, it can be a direct relationship or there can be one or more intervening elements therebetween. When an element is defined as "being connected or coupled to" another element, the element may be directly connected or coupled to the element or one or more centered elements may be present therebetween. As used herein, the terms "vertical", "horizontal", "left", "right", and similar expressions are for illustration purposes.

As used herein, "mounting" includes welding, screwing, snapping, gluing or the like to secure or limit an element or device to a particular position or location, the element or device may remain stationary or movable within limits at the particular position or location, and the element or device may be removable or not after being secured or limited to the particular position or location, which is not limited in the embodiments of the present application.

The present application provides a lamp lighting system including a lamp driver and at least one lamp, the lamp driver is used to drive the at least one lamp. The lamp lighting system may applied to household lighting and industrial lighting, such as, the lamp lighting system may applied to greenhouse and indoor planting, of which the lamp is a plant growth lamp, and the plant growth lamp is a LED lamp, the lamp driver is a LED driver.

Figure 1:
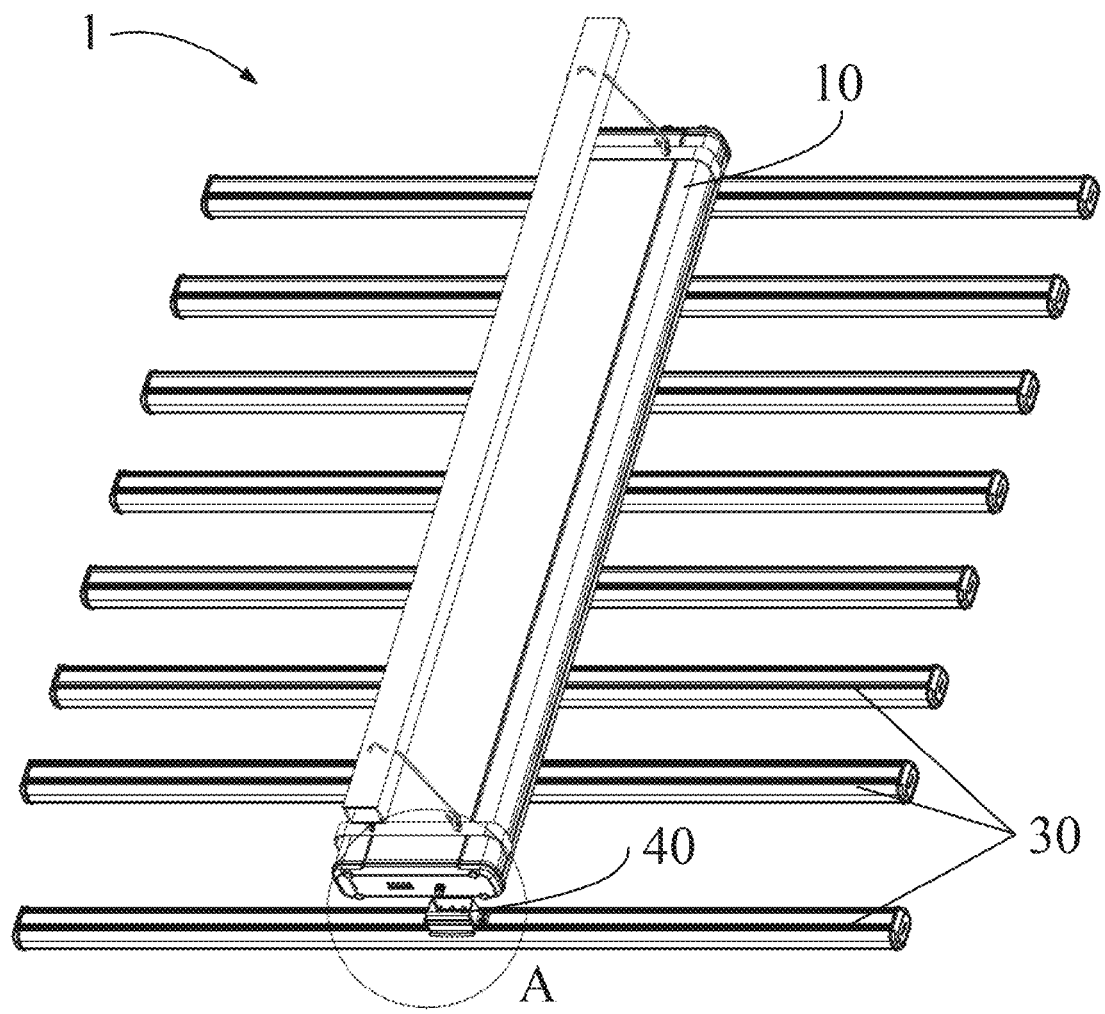
FIG. 1 is a structure schematic diagram of a lamp lighting system according to an embodiment of the present application.
Figure 2:
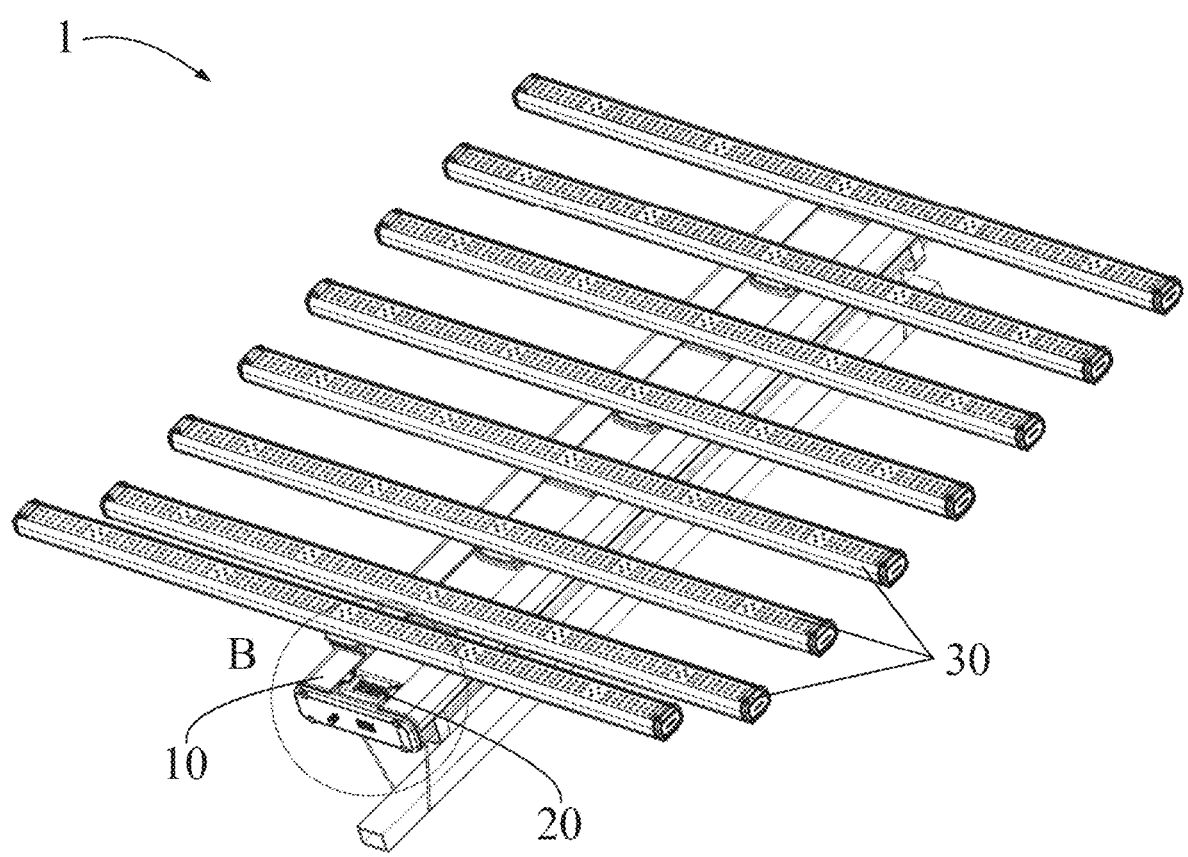
FIG. 2 is a structure schematic diagram of a lamp lighting system from another perspective according to an embodiment of the present application.

Referring to FIGS. 1 and 2, a lamp lighting system 1 according to an embodiment of the present application includes a lamp driver 10 and a plurality of plant growth lamps 30. Wherein, the lamp driver 10 and each plant growth lamp 30 are in a strip shape, and the plurality of plant growth lamps 30 are arranged along a length direction of the lamp driver 10. Optionally, the plurality of plant growth lamps 30 are arranged in parallel along the length direction of the lamp driver 10.

Figure 3:
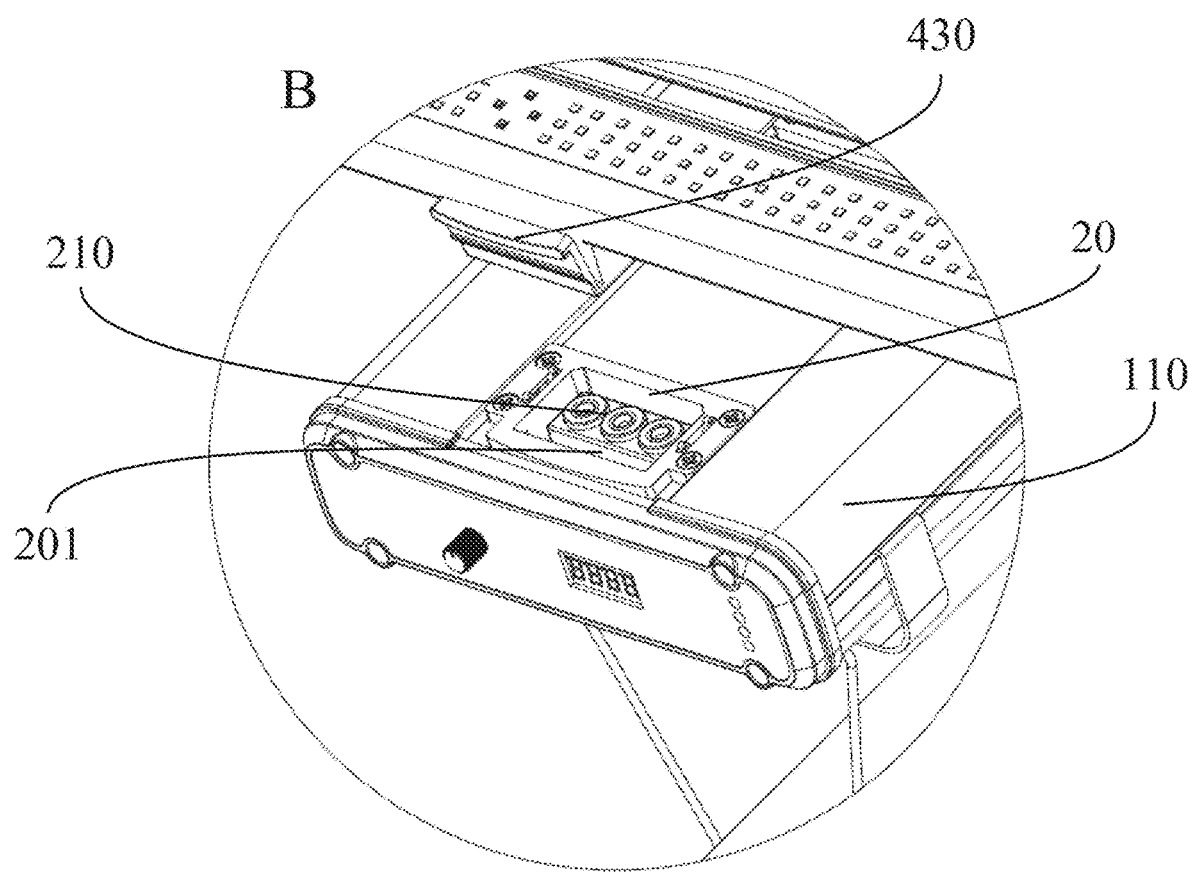
FIG. 3 is a partially enlarged view of part B of FIG. 2.
Figure 4:
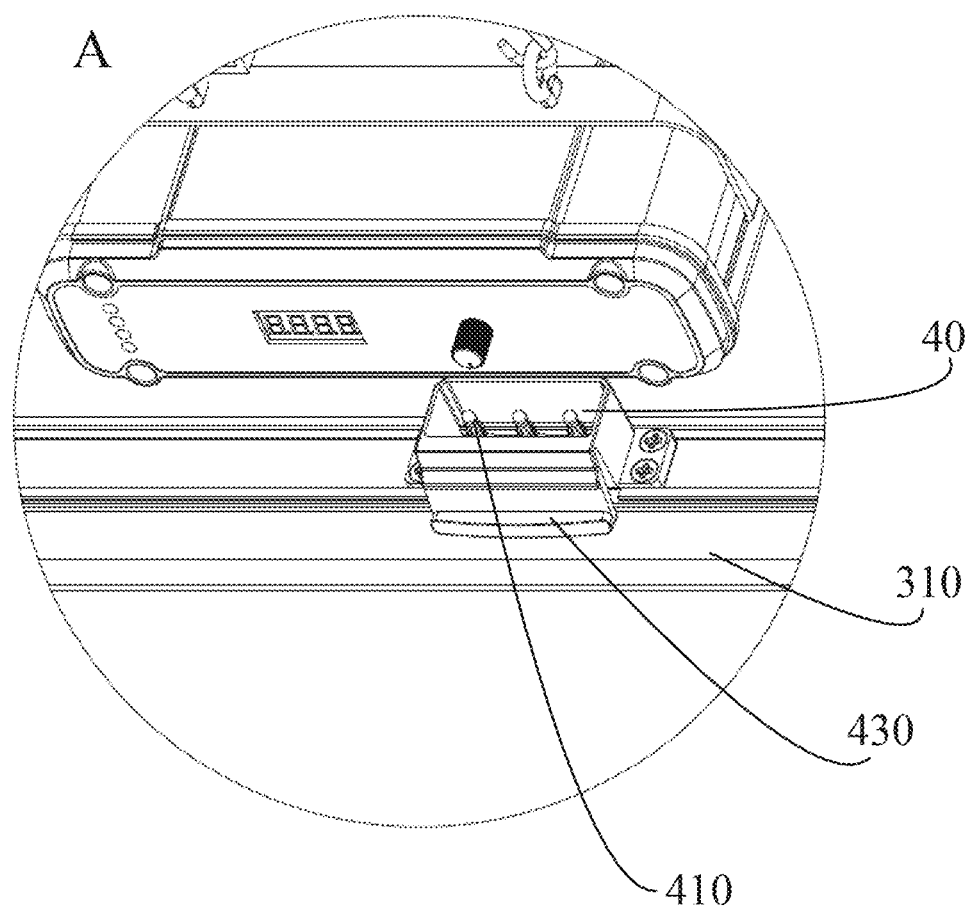
FIG. 4 is a partially enlarged view of part A of FIG. 1.

As shown in FIGS. 3 and 4, the lamp driver 10 includes a housing 110 and a plurality of socket connector 20 fixed on the housing 110, and a socket terminal group 210 of each socket connector 20 is electrically connected to a circuit inside the lamp driver 10. Each plant growth lamp 30 includes a lamp housing 310 and a plug connector 40 fixed on the lamp housing 310, and a plug terminal group 410 of the plug connector 40 is electrically connected to a light-emitting component inside the plant growth lamp 30.

In one embodiment, the socket connector 20 defines at least one clamping slot 201, and the plug connector 40 is provided with at least one buckle 430. When the plant growth lamp 30 is to be installed, only the plug connector 40 is inserted into the socket connector 20, so that the buckle 430 is stuck into the clamping slot 201, and the connection and fixation between the plant growth lamp 30 and the lamp driver 10 can be achieved.

The lamp driver 10 and the plant growth lamp 30 of embodiments of the present application are described in detail below.

Figure 5:
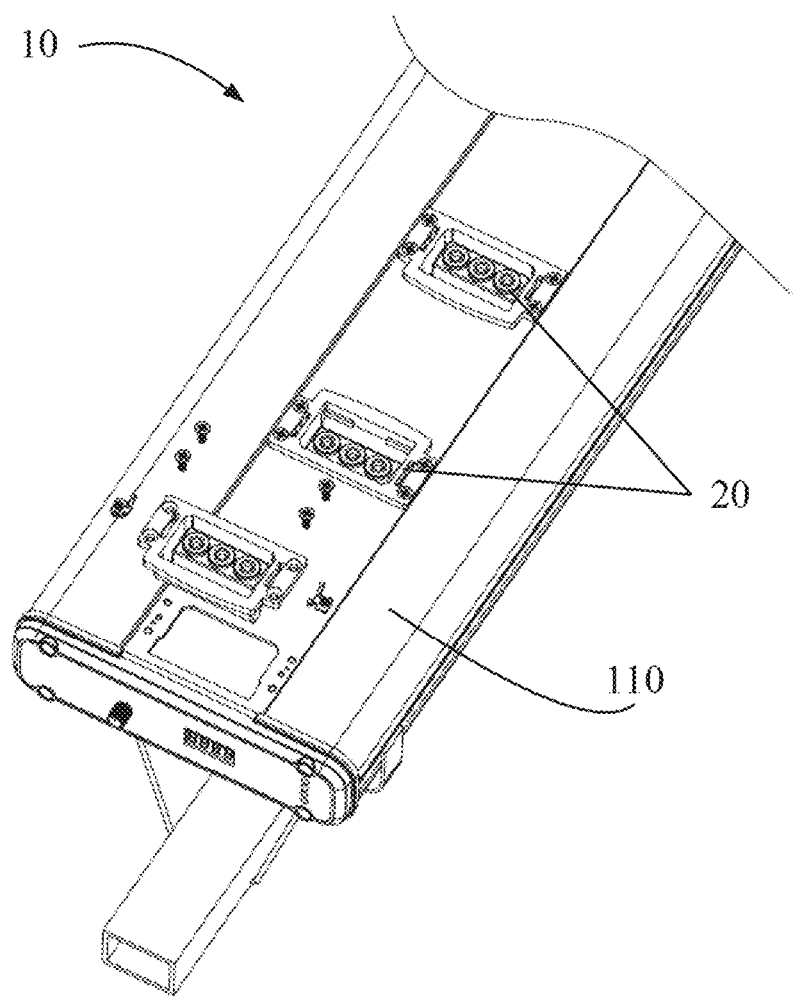
FIG. 5 is a structure schematic diagram of a lamp driver according to an embodiment of the present application.

With reference to FIG. 5, a structure schematic diagram of the lamp driver 10 according to an embodiment of the present application is presented. The lamp driver 10 includes a strip-shaped housing 110 and a plurality of socket connectors 20 fixed on the housing 110. The plurality of socket connectors 20 are arranged in parallel along a length of the housing 110. Each socket connector 20 can be fixed on the housing 110 by means of screws or welding, or other ways.

Figure 6:
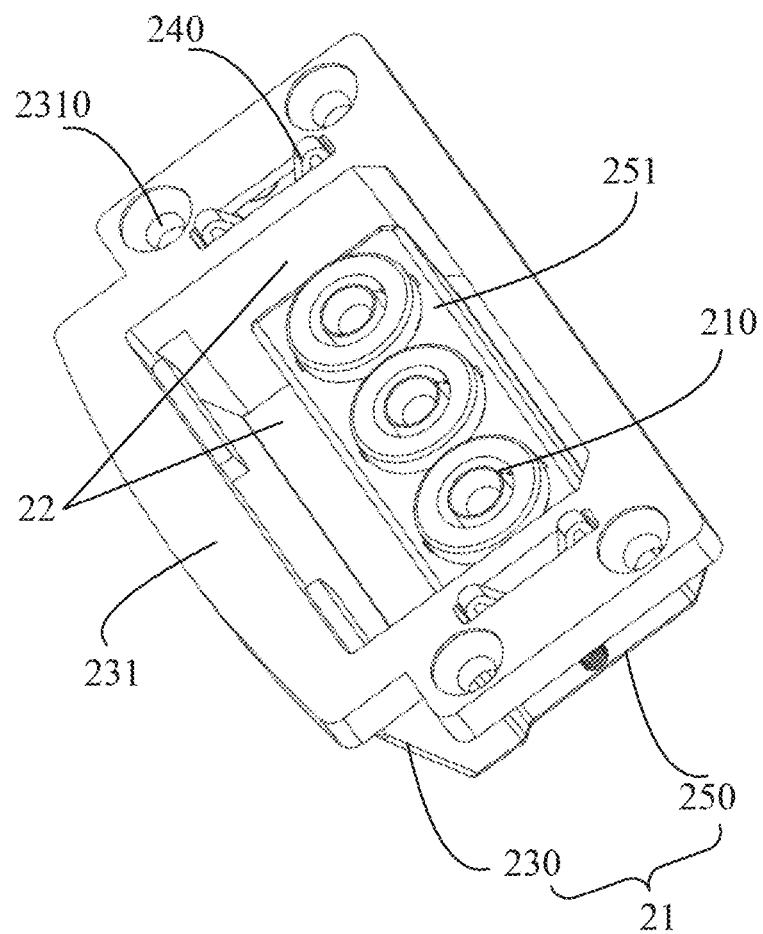
FIG. 6 is a schematic structural diagram of a socket connector according to an embodiment of the present application.
Figure 7:
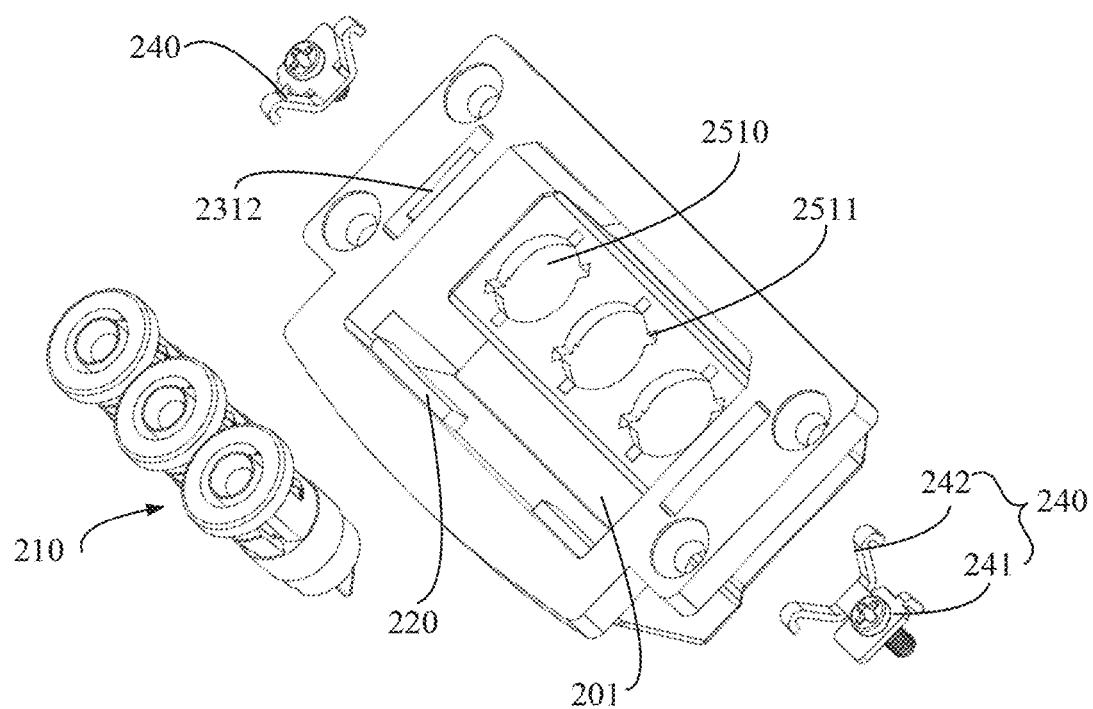
FIG. 7 is an exploded view of a socket connector according to an embodiment of the present application.

With regard to the socket connector 20, reference is made to FIGS. 6 and 7, each socket connector 20 includes a socket insulator 21 and the socket terminal group 210. The whole socket insulator 21 may be an integrally-formed injection molded part, including multiple socket side walls 230 and a socket bottom wall 250. The socket side walls 230 are connected end to end in sequence, enclosing to form a receiving chamber 22 for receiving the plug connector 40, and the socket side walls 230 are all connected to the socket bottom wall 250. The front end of each socket side wall 230 is folded outwards to form an edge 231, and the design of all edges 231 can make interior of the lamp driver 10 have good air tightness.

The socket insulator 21 shown in the figure is roughly rectangular including four socket side walls 230, two edges 231 of opposite two socket side walls 230 define first positioning holes 2310 for screws to pass through to secure the socket connector 20 to the housing 110. In other embodiments, the socket insulator 21 can be another shape, such as a triangle or a hexagon.

Part of the socket bottom wall 250 protrudes into the receiving chamber 22 to form a docking part 251, and the socket terminal group 210 is mounted on the docking part 251. The docking part 251 is provided with a plurality of first mounting holes 2510, the socket terminal group 210 includes a plurality of banana sockets, and a banana socket is installed on a first mounting hole 2510.

Figure 8:
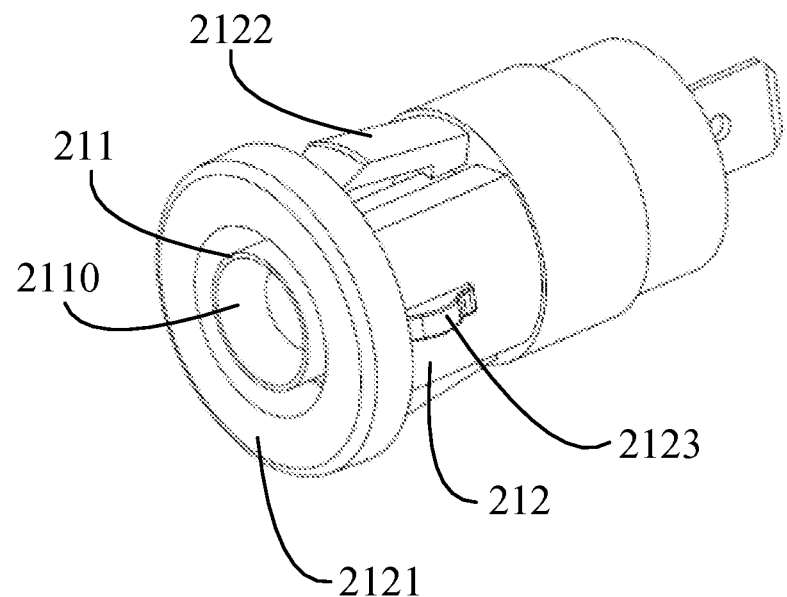
FIG. 8 is a schematic structural diagram of a banana socket according to an embodiment of the present application.

Specifically, as shown in FIG. 8, each banana socket is roughly cylindrical. The front section of the banana socket is a socket part, which is a sleeve structure including an inner cylinder 211 and an outer cylinder 212. The inner cylinder 211 and the outer cylinder 212 are hollow cylinder structures with front openings, and the outer cylinder 212 is sleeved on a periphery of the inner cylinder 211 and abutting a peripheral wall of the first mounting hole 2510.

Figure 9:
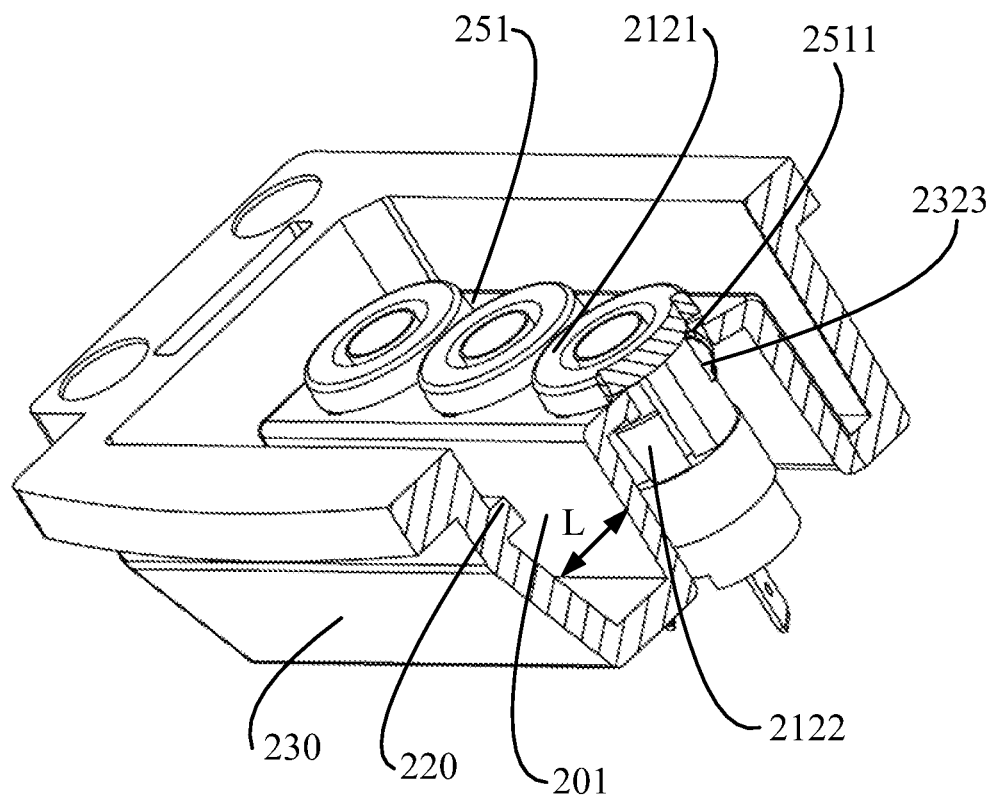
FIG. 9 is a three-dimensional section view of a socket connector according to an embodiment of the present application.

The inner cylinder 211 defines an inner hole 2110 for receiving a plug terminal of the plug connector 40. The front end of the outer cylinder 212 is provided with a stopping part 2121 protruding outwards, and a cylinder wall of the outer cylinder 212 is provided with at least one raised elastic sheet 2122, the elastic sheet 2122 may be formed by tearing from the cylinder wall of the outer cylinder 212. Please refer to FIG. 9 together, when the banana socket is installed on the first mounting hole 2510, the stopping part 2121 and the elastic sheet 2122 are located on the front and back sides of the docking part 251, and the banana socket is axially limited to a certain degree by cooperation of the stopping part 2121 and the elastic sheet 2122.

Further, the cylinder wall of the outer cylinder 212 is also provided with at least one raised blocking part 2123, the blocking part 2123 is closer to the stopping part 2121 than the elastic sheet 2122, the docking part 251 defines at least one groove 2511 on the peripheral wall of the first mounting hole 2510, and the number of the grooves 2511 is the same as the number of the blocking parts 2123, or larger than the number of the blocking parts 2123. When the banana socket is installed on the first mounting hole 2510, at least part of the blocking part 2123 is located in the groove 2511, and the banana socket is circumferentially limited by the blocking part 2123.

In an embodiment, the banana sockets include a first banana socket, a second banana socket, and a third banana socket. More specifically, the first banana socket is a red positive banana socket, the second banana socket is a blue positive banana socket, and the third banana socket is a black negative banana socket.

In the case that the socket insulator 21 includes four socket side walls 230, the receiving chamber 22 including four receiving slots formed between the docking part 251 and four socket side walls 230, i.e., one side of the docking part 251 and one socket side wall 230 form a receiving slot. Among them, at least one of the four receiving slots is the clamping slot 201, which is configured to receive the buckle 430 of the plug connector 40, and the width L of the clamping slot 201 is larger than that of other receiving slots. The width L of the clamping slot 201 gradually decreases along a direction of insertion of the plug connector 40, that is, along the direction of insertion of the plug connector 40, the distance between the docking part 251 and a socket side wall 230 located both sides of the clamping slot 201 gradually decreases, to facilitate the insertion and extraction of the plug connector 40.

Figure 10:
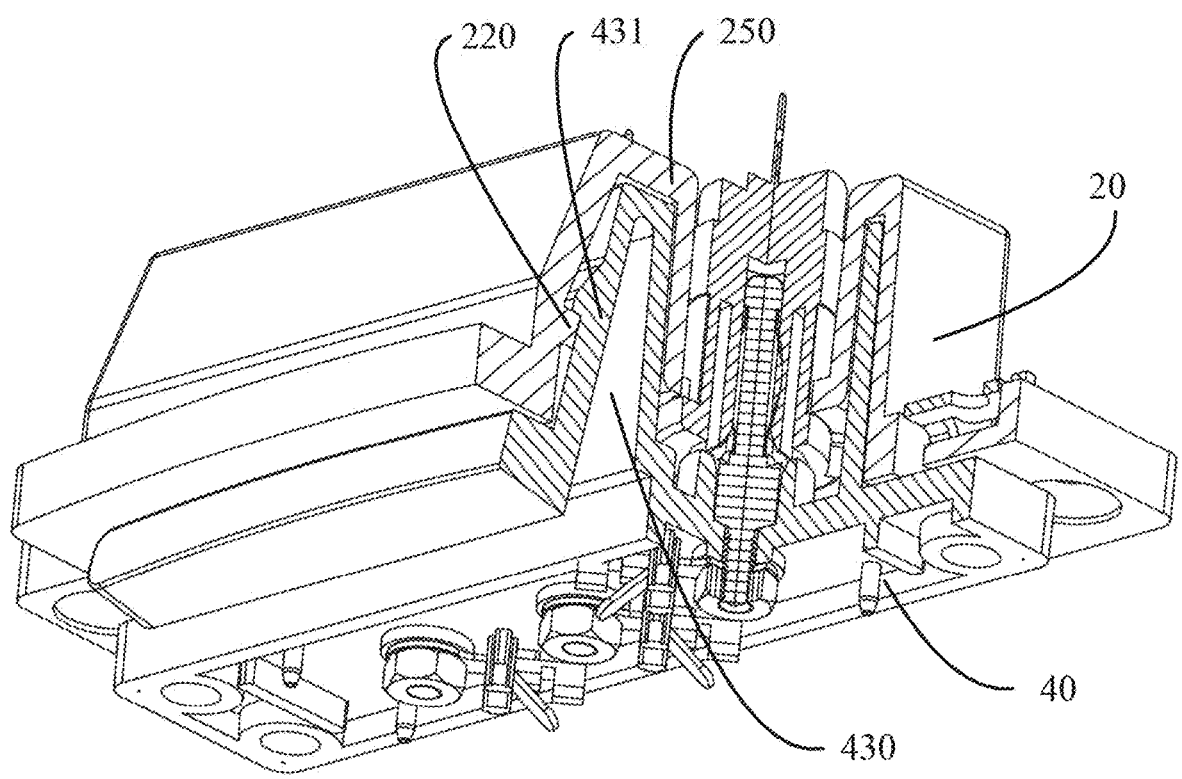
FIG. 10 is a three-dimensional section view of a socket connector and a plug connector in connected state according to an embodiment of the present application.
Figure 11:
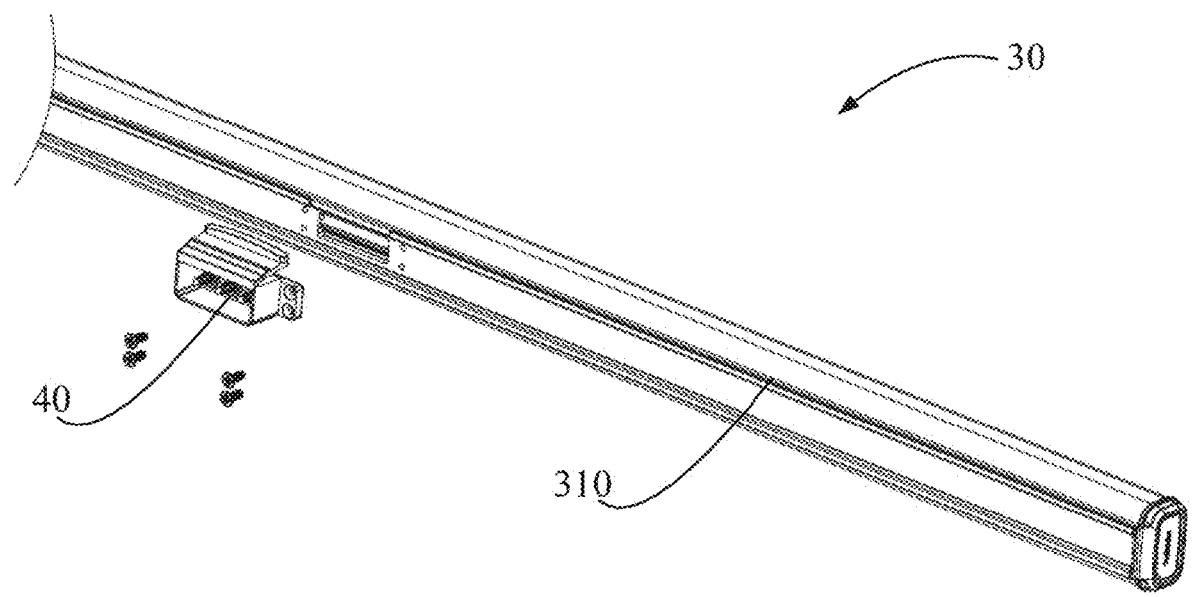
FIG. 11 is a structure schematic diagram of a plant growth lamp according to an embodiment of the present application.

The socket side wall 230 corresponding to the clamping slot 201 is provided with a stepped part 220 parallel to the socket bottom wall 250. The stepped part 220 protrudes from the socket side wall 230 into the clamping slot 201. As shown in FIG. 10, when the plug connector 40 is accommodated in the socket connector 20, the stepped part 220 can prevent the plug connector 40 from detaching from the socket connector 20.

With reference to FIG. 1I, a structure schematic diagram of the plant growth lamp 30 according to an embodiment of the present application is presented. The plant growth lamp 30 includes a strip-shaped lamp housing 310 and the plug connector 40 fixed on the lamp housing 310. The plug connector 40 can be fixed on the lamp housing 310 by means of screws or welding, or other ways.

Figure 12:
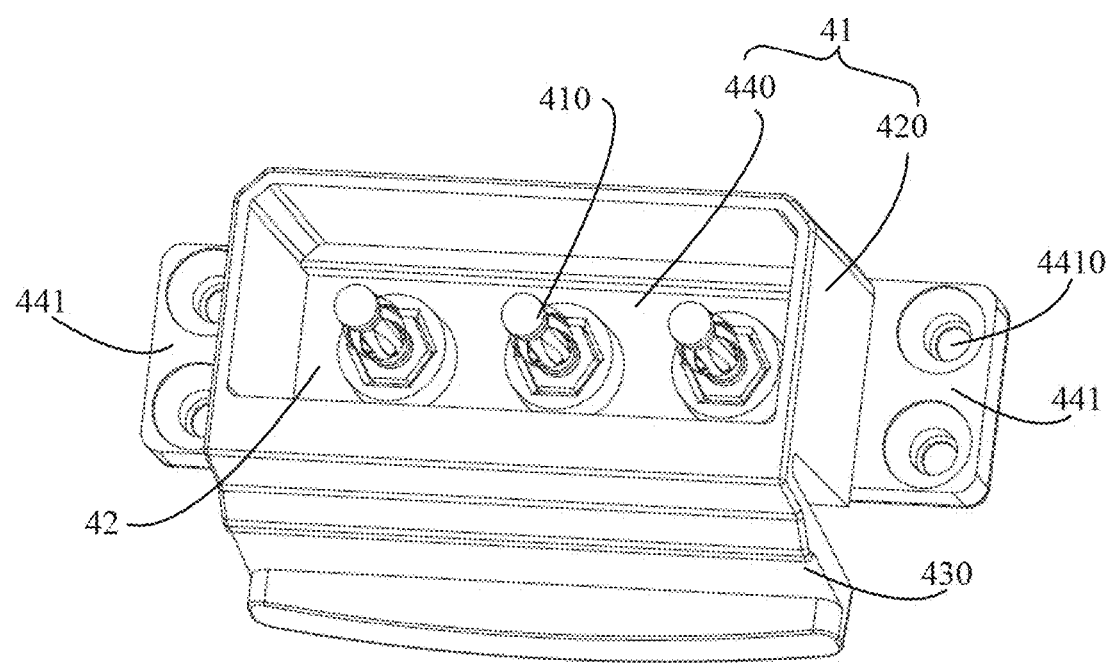
FIG. 12 is a structure schematic diagram of a plug connector according to an embodiment of the present application.
Figure 13:
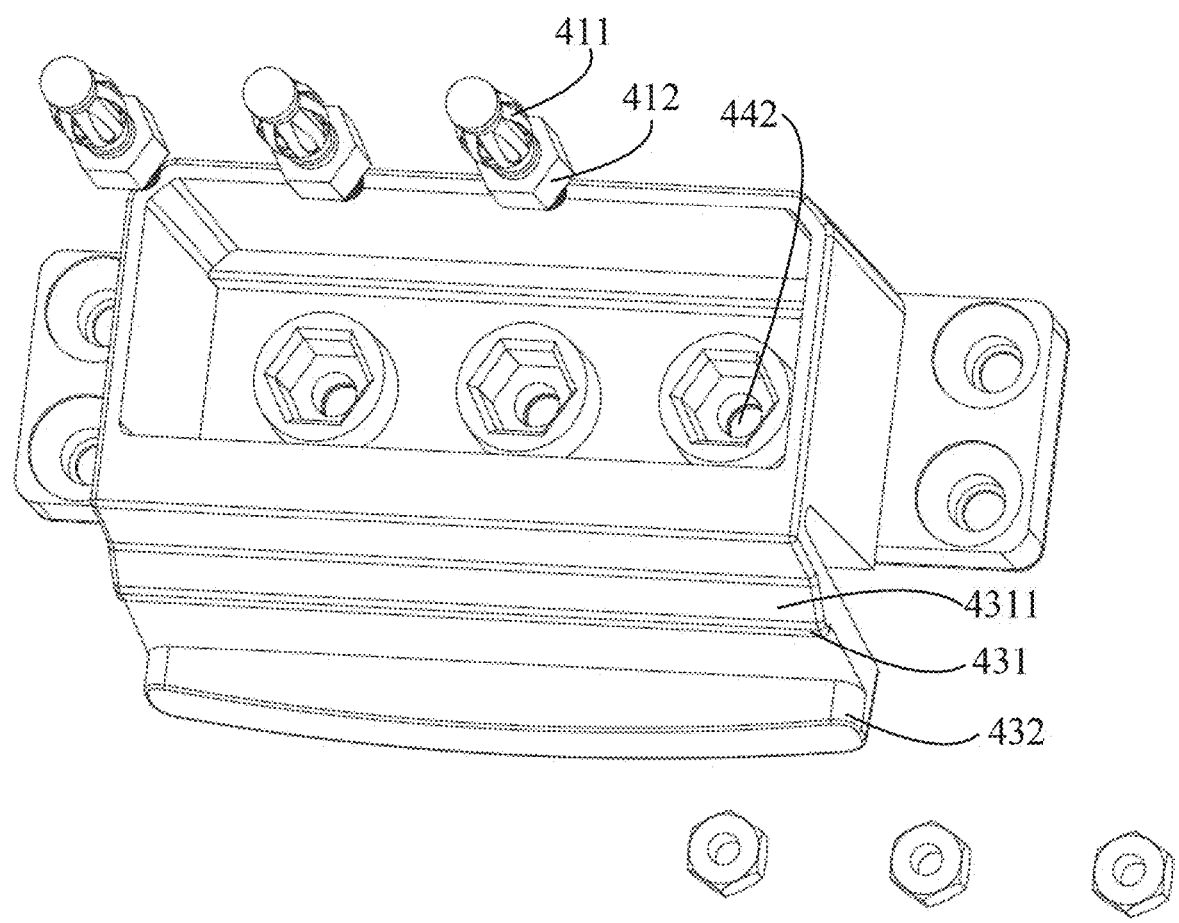
FIG. 13 is an exploded view of a plug connector according to an embodiment of the present application.

With regard to the plug connector 40, reference is made to FIGS. 12 and 13, the plug connector 40 includes a plug insulator 41 and the plug terminal group 410. In one embodiment, the plug insulator 41 includes four plug side walls 420 and a plug bottom wall 440, the four plug side walls 420 are connected end to end in sequence, enclosing to form a docking chamber 42 for docking with the docking part 251 of the socket connector 20, shape of the docking chamber 42 matches shape of the docking part 251, and the four plug side walls 420 are all connected to the plug bottom wall 440, the plug terminal group 410 is mounted on the plug bottom wall 440 and is exposed in the docking chamber 42.

Two opposite sides of the plug bottom wall 440 extend outwards in parallel to form bottom edges 441, and the bottom edges 441 define second positioning holes 4410 for screws to pass through to secure the plug connector 40 to the lamp housing 310.

The plug bottom wall 440 is provided with a plurality of second mounting holes 442, the plug terminal group 410 includes a plurality of banana plugs, and a banana plug is installed on a second mounting hole 442.

Specifically, each banana plug is roughly cylindrical bar. The front section of the banana plug is exposed in the docking chamber 42 and is provided with an elastic cover 411, the elastic cover 411 is in a shape of a lantern with a number of elastic sheets evenly distributed in a circle. The outer peripheral surface of the middle section of the banana plug is provided with a stopper 412 protruding outwards. The rear section of the banana plug is provided with external threads, so that when the banana plug is installed on the second mounting hole 442, the rear section of the banana plug may be fixed by a pressing nut after passing through the second mounting hole 442.

Corresponding to the above socket connector 20, the banana plugs include a first banana plug, a second banana plug, and a third banana plug. More specifically, the first banana plug is a red positive banana plug, the second banana plug is a blue positive banana plug, and the third banana plug is a black negative banana plug.

The front end of at least one plug side wall 420 of the four plug side walls 420 is reversely folded outwards to form the buckle 430, and the buckle 430 and an outer surface of a corresponding plug side wall 420 form a V-shaped structure. The number of buckles 430 is the same as the number of the clamping slots 201, and one buckle 430 can be accommodated in one clamping slot 201. The buckle 430 is provided with a limiting part 431 protruding outwards, and along the direction of insertion of the plug connector 40, an inclined guide surface 4311 is provided in front of the limiting part 431, the guiding surface 4311 is used to guide the plug connector 40 into the socket connector 20 until the limiting part 431 goes over the stepped part 220 in the clamping slot 201 of the socket connector 20.

The whole plug insulator 41 may be an integrally-formed injection molded part, so the buckle 430 has a certain elasticity, and can be approached to the corresponding plug side wall 420 under action of external pressure. In another embodiment, the buckle may be a metal buckle, for example, the buckle is an integrally-formed V-shaped metal member, one side of the metal member is fixed on an outer surface of a plug side wall 420, and the other side equivalent to the buckle is provided with a raised limiting part, similarly, the other side of the metal member and an outer surface of the corresponding plug side wall form a V-shaped structure.

Optionally, the end of the buckle 430 away from the corresponding plug side wall is provided with a pressing portion 432 protruding outwards.

When the plant growth lamp 30 is to be fixed to the lamp driver 10, press the pressing portion 432 to make the buckle 430 closer to the corresponding plug side wall 420 and align with the clamping slot 201, then push the plug connector 40 into the socket connector 20 until the limiting part 431 goes over the stepped part 220, and then release the pressing portion 432, the buckle 430 expands outwards under action of its own elastic recovery force, and its limiting part 431 is clamped between the socket bottom wall 250 and the stepped part 220 of the socket connector 20 (as shown in FIG. 10), so that the plug connector 40 is fixed in the socket connector 20.

When the plant growth lamp 30 is perpendicular to or tilted on the ground and installed downward, under action of gravity, the rear end of the limiting part 431 on the buckle 430 abuts the stepped part 220 on the socket side wall 230, and the plug connector 40 can be more fixed in the socket connector 20.

In another embodiment of the present application, in order to ensure that the rear end of the limiting part 431 can abut on the stepped part 220 in all directions, for example, when the plant growth lamp 30 is perpendicular to the ground and installed upward, please refer to FIGS. 6 and 7 again, the lamp driver 10 or the socket connector 20 further includes at least one elastic member 240. The elastic member 240 includes a main body 241 and an elastic arm 242 provided on one end of the main body 241. The main body 241 is mounted between back of an edge 231 of the socket insulator 21 and the housing 110 of the lamp driver 10, and the corresponding edge 231 defines a mounting slot 2312 for the elastic arm 242 to pass out.

The elastic member 240 shown in the figure includes two elastic arms 242, the two elastic arms 242 and the one end of the main body 241 form M-shape, the main body 241 may be fixed on one of back of the corresponding edge 231 of the socket insulator 21 and the housing 110 of the lamp driver 10. Optionally, the socket connector 20 includes two elastic members 240, and the two elastic members 240 are located in two opposite edges 231 of the socket insulator 21 and fixed on back of the two opposite edges 231.

In the process of pushing the plug connector 40 into the socket connector 20, the elastic arms 242 is compressed by the bottom edges 441 of the plug insulator 41 or the lamp housing 310. After releasing the pressing portion 432, the elastic arms 242 gives the plug connector 40 a force that is always away from the socket connector 20, so that the rear end of the limiting part 431 on the buckle 430 always abuts the stepped part 220 in the clamping slot 201.

When the plant growth lamp 30 needs to be disassembled, press the pressing portion 432 in the same way, and pull out the plug connector 40 in a direction away from the lamp driver 10 to separate the plant growth lamp 30 from the lamp driver 10.

In a scenario, plant growth lamps are electrically connected to a lamp driver through multiple external cable lines, the external cable lines occupies space and affects the appearance, and there are also problems of poor contact caused by cable shedding and wear. However, the connection between the plant growth lamps 30 and the lamp driver 10 according to embodiments of the present applications can be achieved by direct connection between the plug connectors 40 and the socket connectors 20, so that the efficiency of installation and disassembly is improved, and the plant growth lamps 30 may be directly fixed on the housing 110 of the lamp driver 10, lamp frames can be omitted, accordingly, the structure of the lamp lighting system 1 is compact, and the installation cost is reduced.

Finally, it should be noted that the above examples are intended only to illustrate the technical solutions of the present application, not to be limiting; the above embodiments or technical features in different embodiments may also be combined, the steps may be carried out in any order according to the idea of the present application, and many other variations in different aspects of the invention as described above exist, which are not provided in detail for the sake of brevity; although the present application has been described in detail with reference to the foregoing embodiments, those skilled in the art will appreciate that the technical solutions of the above embodiments can still be modified, or some of the technical features thereof may found their equivalents; and these modifications and equivalents do not render departures from the scope of the present embodiments of the invention.

What is claimed is:

1. A lamp, comprising a lamp housing and a plug connector fixed on the lamp housing;
   wherein the plug connector comprises a plug insulator, a plug terminal group and at least one buckle,
   the plug insulator comprises a plurality of plug side walls and a plug bottom wall,
   the plurality of plug side walls enclose to form a docking chamber for docking with a socket connector of a lamp driver,
   the plug terminal group is mounted on the plug bottom wall and is exposed in the docking chamber;
   the buckle is connected with one plug side wall and forms a V-shaped structure with an outer surface of the plug side wall, and the buckle is configured to fix the plug connector in the socket connector;
   wherein the plug insulator is an integrally-formed injection molded part, and the buckle is formed by a front end of the plug side wall being reversely folded outwards.

2. The lamp according to claim 1, wherein the buckle is provided with a limiting part protruding outwards, and along a direction in which the plug connector is inserted into the socket connector, an inclined guide surface is provided in front of the limiting part.

3. The lamp according to claim 1, wherein one end of the buckle away from the plug side wall is provided with a pressing portion protruding outwards.

4. The lamp according to claim 1, wherein the plug terminal group comprises a plurality of banana plugs, a front section of each banana plug is exposed in the docking chamber and is provided with an elastic cover, the elastic cover is in a shape of a lantern with a number of elastic sheets evenly distributed in a circle.

5. The lamp according to claim 1, wherein the plug insulator comprises four plug side walls, and the four plug side walls are all connected to the plug bottom wall;
   two opposite sides of the plug bottom wall extend outwards in parallel to form bottom edges, and the bottom edges define second positioning holes.

6. A lamp driver, comprising a housing and at least one socket connector fixed on the housing;
   wherein the socket connector comprises a socket insulator and a socket terminal group, the socket insulator comprises a plurality of socket side walls and a socket bottom wall, the plurality of socket side walls enclose to form a receiving chamber for receiving a plug connector of a lamp, part of the socket bottom wall protrudes into the receiving chamber to form a docking part, and the socket terminal group is mounted on the docking part;
   the receiving chamber comprises at least one clamping slot formed by one side of the docking part and one socket side wall, and the clamping slot is configured to prevent the plug connector from detaching from the socket connector;
   wherein the docking part is provided with a plurality of first mounting holes, the socket terminal group comprises a plurality of banana sockets, and a banana socket is installed on a first mounting hole;
   a front section of each banana socket is a sleeve structure comprising an inner cylinder and an outer cylinder, the inner cylinder defines an inner hole, the outer cylinder is sleeved on a periphery of the inner cylinder and abutting a peripheral wall of the first mounting hole.

7. The lamp driver to claim 6, wherein the socket side wall corresponding to the clamping slot is provided with a stepped part parallel to the socket bottom wall.

8. The lamp driver to claim 7, wherein along a direction in which the plug connector is inserted into the socket connector, a width of the clamping slot gradually decreases.

9. The lamp driver to claim 6, wherein a front end of the outer cylinder is provided with a stopping part protruding outwards, and a cylinder wall of the outer cylinder is provided with at least one raised elastic sheet, the elastic sheet is formed by tearing from the cylinder wall of the outer cylinder;
   the stopping part and the elastic sheet are located on the front and back sides of the docking part.

10. The lamp driver to claim 9, wherein the cylinder wall of the outer cylinder is provided with at least one raised blocking part;
    the docking part defines at least one groove on the peripheral wall of the first mounting hole, and at least part of the blocking part is located in the groove.

11. The lamp driver to claim 6, wherein the lamp driver further comprises at least one elastic member, the elastic member comprises a main body and an elastic arm;
    a front end of each socket side wall is folded outwards to form an edge, at least one edge defines a mounting slot, the main body of the elastic member is mounted between back of the edge and the housing, and the elastic arm passes through the mounting slot.

12. The lamp driver to claim 6, wherein the lamp driver comprises a plurality of socket connectors;

the housing is strip-shaped and the plurality of socket connectors are arranged in parallel along a length of the housing.

13. A lamp lighting system, comprising a lamp driver and at least one lamp;

wherein the lamp comprises a lamp housing and a plug connector fixed on the lamp housing, the lamp driver comprises a housing and at least one socket connector;

the plug connector comprises a plug insulator, a plug terminal group and at least one buckle, the plug insulator comprises a plurality of plug side walls and a plug bottom wall, the plurality of plug side walls enclose to form a docking chamber for docking with the socket connector, the plug terminal group is mounted on the plug bottom wall and is exposed in the docking chamber;

the buckle is connected with one plug side wall and forms a V-shaped structure with an outer surface of the plug side wall;

the socket connector comprises a socket insulator and a socket terminal group, the socket insulator comprises a plurality of socket side walls and a socket bottom wall, the plurality of socket side walls enclose to form a receiving chamber, part of the socket bottom wall protrudes into the receiving chamber to form a docking part, shape of the docking part matches shape of the docking chamber, and the socket terminal group is mounted on the docking part;

the receiving chamber comprises at least one clamping slot formed by one side of the docking part and one socket side wall;

the plug connector is connected with the socket connector, and the buckle of the plug connector is stuck into the clamping slot of the socket connector;

wherein the plug insulator is an integrally-formed injection molded part, and the buckle is formed by a front end of the plug side wall being reversely folded outwards.

14. The lamp lighting system according to claim 13, wherein the socket side wall corresponding to the clamping slot is provided with a stepped part parallel to the socket bottom wall, the buckle of the plug connector is provided with a limiting part protruding outwards, and the limiting part is clamped between the socket bottom wall and the stepped part;

along a direction in which the plug connector is inserted into the socket connector, an inclined guide surface is provided in front of the limiting part, and a width of the clamping slot gradually decreases.

15. The lamp lighting system according to claim 13, wherein the plug terminal group comprises a plurality of banana plugs, a front section of each banana plug is exposed in the docking chamber and is provided with an elastic cover, the elastic cover is in a shape of a lantern with a number of elastic sheets evenly distributed in a circle;

the socket terminal group comprises a plurality of banana sockets, a front section of each banana socket is a sleeve structure comprising an inner cylinder and an outer cylinder, the inner cylinder defines an inner hole for receiving the front section of the banana plug, the outer cylinder is sleeved on a periphery of the inner cylinder and abutting a peripheral wall of the first mounting hole.

16. The lamp lighting system according to claim 13, wherein the lamp driver further comprises at least one elastic member, the elastic member comprises a main body and an elastic arm;

a front end of each socket side wall is folded outwards to form an edge, at least one edge defines a mounting slot, the main body of the elastic member is mounted between back of the edge and the housing, and the elastic arm passes through the mounting slot and abuts the plug connector.

17. The lamp lighting system according to claim 16, wherein the socket insulator comprises four socket side walls, and the four socket side walls are all connected to the socket bottom wall, two edges of opposite two socket side walls define first positioning holes;

the plug insulator comprises four plug side walls, the four plug side walls are all connected to the plug bottom wall, two opposite sides of the plug bottom wall extend outwards in parallel to form bottom edges, and the bottom edges define second positioning holes.

\* \* \* \* \*